United States Patent
Wiegman et al.

(10) Patent No.: US 8,218,341 B2
(45) Date of Patent: Jul. 10, 2012

(54) INTEGRATED AIRCRAFT POWER CONDITIONING UNIT

(75) Inventors: Herman Lucas Norbert Wiegman, Niskayuna, NY (US); William Eugene Carlson, Liberty Township, OH (US)

(73) Assignee: General Electric Company, Niskayuna, NY (US)

( * ) Notice: Subject to any disclaimer, the term of this patent is extended or adjusted under 35 U.S.C. 154(b) by 785 days.

(21) Appl. No.: 12/238,905

(22) Filed: Sep. 26, 2008

(65) Prior Publication Data

US 2010/0080027 A1 Apr. 1, 2010

(51) Int. Cl.
*H02M 5/45* (2006.01)
*H02J 1/10* (2006.01)
*H02M 7/48* (2007.01)

(52) U.S. Cl. .............................. 363/37; 363/65; 363/71

(58) Field of Classification Search .................. 363/34, 363/35, 37, 63, 65, 71, 97, 98, 123, 131, 363/132, 137
See application file for complete search history.

(56) References Cited

U.S. PATENT DOCUMENTS

| | | | |
|---|---|---|---|
| 4,697,090 A * | 9/1987 | Baker et al. | 290/4 R |
| 4,841,202 A * | 6/1989 | Dishner et al. | 318/14 |
| 6,693,805 B1 | 2/2004 | Steigerwald et al. | |
| 2004/0112320 A1 * | 6/2004 | Bolz et al. | 123/179.28 |
| 2006/0137355 A1 * | 6/2006 | Welch et al. | 60/772 |
| 2007/0236186 A1 * | 10/2007 | Patterson | 322/59 |

* cited by examiner

*Primary Examiner* — Adolf Berhane
*Assistant Examiner* — Jeffrey Gblende
(74) *Attorney, Agent, or Firm* — Penny A. Clarke

(57) ABSTRACT

An integrated power conditioning unit includes a DC bus, a first terminal for connection to first AC equipment, a second terminal for connection to second AC equipment, a first inverter circuit providing bi-directional AC-DC conversion between a first AC power signal and a first DC power signal, and a converter assembly providing bi-directional AC-DC conversion between a second AC power signal and a second DC power signal. A control module controls the first inverter circuit such that the first DC power signal may flow from/to the DC bus and the first AC power signal may flow from/to the first terminal. The control module also controls the converter assembly such that the second AC signal power signal may flow from/to the second terminal and the second DC power signal may flow from/to the DC bus.

16 Claims, 7 Drawing Sheets

INTEGRATED AIRCRAFT POWER CONDITIONING UNIT

BACKGROUND OF THE INVENTION

This invention relates to an electric power processing device, and more particularly, to an integrated aircraft power conditioning and control unit that interfaces generation equipment with various load equipment utilizing independent voltages levels and frequencies.

Many industries can benefit from lightweight power conditioning systems that are also flexible in providing a variety of voltages of different magnitudes and frequencies. One such industry is the aviation industry. For example, advances in unmanned aircraft are necessitating new electric power system architectures that allows the unmanned aircraft to be autonomous while minimizing the size and weight of the aircraft. The related art equipment currently being used to support such prototype aircraft is not optimal with respect to the size and weight of the electric power system. A flexible power conversion system will allow power to flow between various "flavors" of electricity (i.e., between AC and DC and between low voltage and high voltage) to achieve various modes of operation onboard modern aircraft. The various modes of operation may include engine start, ground support, normal flight and emergency operation.

FIG. 1 illustrates a related art electric power system for an aircraft. The electric power system includes generator 10, generator control unit (GCU) 15, External Power Connection (EPC) DC ground cart interface 40, high voltage battery 20, low voltage battery 30, DC-DC converter 50 and inverter 60. A typical aircraft may have two electrical power systems similar to that illustrated in FIG. 1.

Generator 10 includes a wound field synchronous machine (WFSM) 12 that is configured to be used as a generator. Generator 10 also includes a permanent magnet generator (PMG) 13 that supplies control power to GCU 15. WFSM 12 and PMG 13 are both mounted on a shaft from engine gear box 5. The output of generator 10 forms a high voltage DC bus 25 by rectifying the output of WFSM 12 using rectifier 11. GCU 15 controls the excitation voltage of WFSM 12 to maintain a desired DC voltage at the output of generator 10. In this configuration, high voltage DC bus 25 is the source for all the electrical power for the aircraft, and high voltage DC bus 25 may, for example, have a magnitude of 270 volts.

Connected to high voltage DC bus 25 is high voltage battery 20. During normal operation, the charge on high voltage battery 20 is maintained by generator 10 via high voltage DC bus 25. A battery charger and disconnect switches (both features not shown) may be connected between the high voltage battery 20 and high voltage DC bus 25. When generator 10 is not available or if the power from generator 10 is insufficient, high voltage battery 20 provides power to high voltage DC bus 25 to operate the equipment.

The input power to DC-DC converter 50 is provided by high voltage DC bus 25, and the output of DC-DC converter 50 forms a low voltage DC bus 35 that supplies control power to the system avionics. During normal flight operation, the charge on low voltage battery 30 is maintained by DC-DC converter 50 via low voltage DC bus 35. A battery charger and disconnect switches (both features not shown) may be connected between low voltage battery 30 and the low voltage DC bus. If DC-DC converter 50 is not operational or if the power from DC-DC converter 50 is insufficient, low voltage battery 30 will provide power to low voltage DC bus 35. The magnitude of low voltage DC bus 35 may be, for example, 28 volts.

Inverter 60 provides power to legacy equipment that run on AC power. Inverter 60 gets its supply from high voltage DC bus 25 and converts the DC power to AC power at, for example, 115 volts, 400 Hz.

EPC DC ground cart interface 40 is connected to high voltage DC bus 25 and allows for external power to supply the aircraft when the aircraft is on the ground (shore power). For example, EPC DC ground cart 41 provides power to the 270 VDC equipment and the 115 volt, 400 Hz equipment via inverter 60.

Alternatively, an EPC AC ground cart (not shown in FIG. 1) may be connected to the legacy AC bus to provide power to the legacy equipment when the aircraft is on the ground. However, the related art system described above does not allow the EPC AC ground cart to assist high voltage battery 20 in main engine startup (main engine startup circuitry is not shown in FIG. 1). Adding additional circuitry to permit the EPC AC ground cart to assist in the main engine start will add additional weight and complexity to the power conditioning system of the aircraft because the AC power will have to be converted to DC.

In addition, the modular design of the related art control system also adds to the complexity and weight of the power conditioning system. FIG. 2 illustrates a control block diagram for the related art modular control system. The functional control and fault management functions used in making strategic decisions in the power conditioning unit are performed at the "highest" level in the vehicle control module 70.

At an "intermediate" level, the bus power control unit module (BPCU) 80 monitors the EPC controls and the left/right half bus protection and controls, i.e., the two generator systems of the aircraft.

At a "low" level, individual control circuit modules such as the GCU module 90 and the Inverter module 95 perform the "detailed" functions necessary to control the respective equipment. For example, the GCU module 90 has a voltage regulation block to maintain the voltage from generator 10 at a preset value and a protection and breaker control block to protect generator 10 from damage. Inverter module 95 has an engine start inverter control block that controls the start of the main engines (not shown in FIG. 1) and a legacy load control block that maintains the AC voltage on the legacy AC bus.

The separate nature of the control modules shown in FIG. 2 add to wiring mass, complexity and interface issues in the related art power conditioning systems. In contrast, the present invention provides a flexible, integrated power conditioning system that permits EPC AC or DC ground carts to supplement the high voltage batteries in main engine startup. By integrating the control modules of various power conditioning unit components into, for example, a single control module, the weight of the system can be lessened because the wires connecting the various individual control modules will be eliminated. In addition, the overall complexity and interface issues will be lessened. Moreover, the flexible nature of the power conditioning system will allow the onboard battery to be sized appropriately, thereby, allowing for an additional reduction in weight.

SUMMARY OF THE INVENTION

In an embodiment of the invention, an integrated power conditioning unit includes a DC bus, a first terminal for connection to first AC equipment, a second terminal for connection to second AC equipment, a first inverter circuit providing bi-directional AC-DC conversion between a first AC power signal and a first DC power signal, and a converter assembly providing bi-directional AC-DC conversion between a second AC power signal and a second DC power signal.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 3:
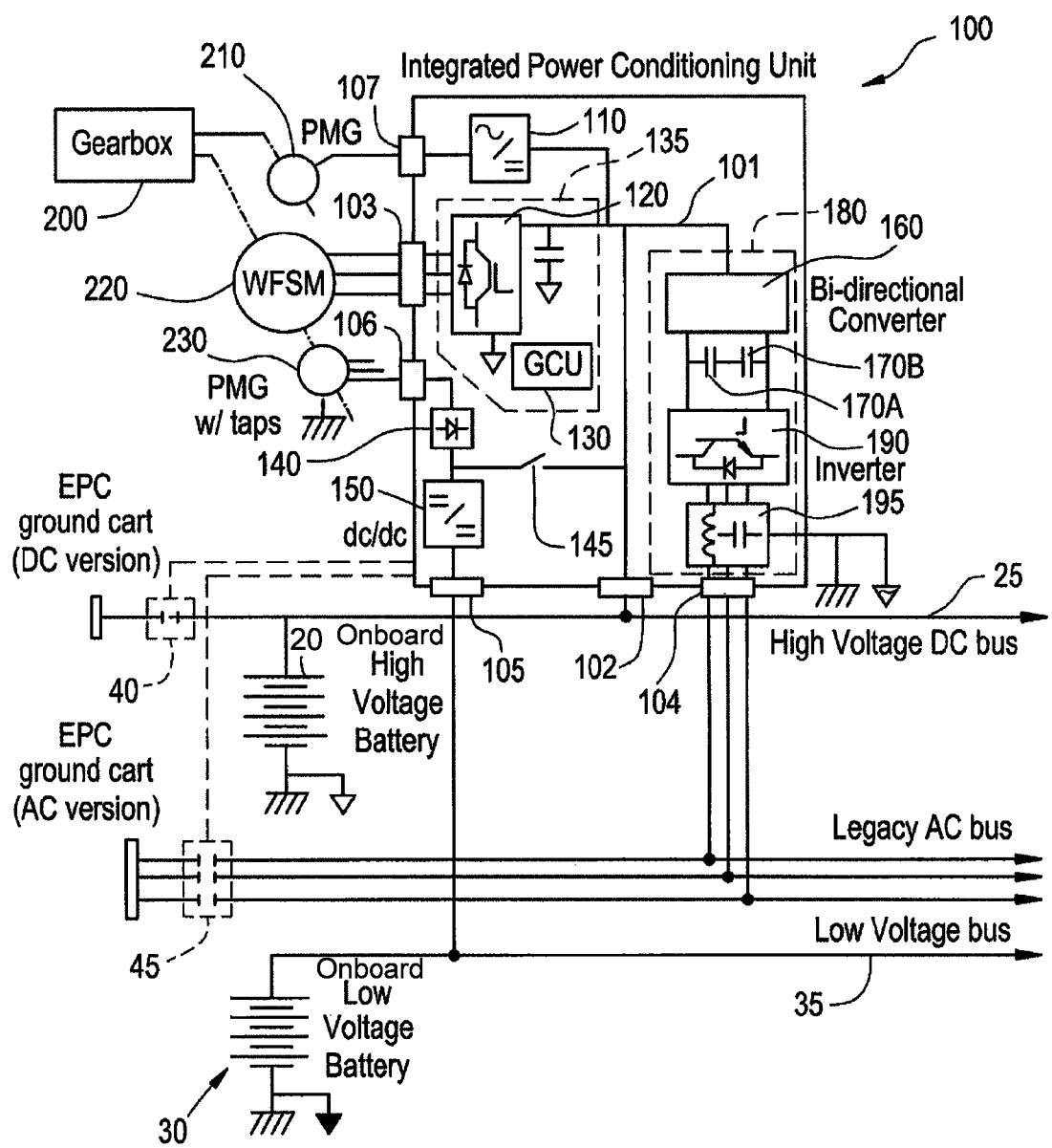
FIG. 3 is a block diagram of an integrated power conditioning unit according to an exemplary embodiment of the present system.

FIG. 3 illustrates a block diagram of a power conditioning unit consistent with an embodiment of the present invention. The power conditioning unit 100 comprises DC bus 101, DC-DC converter 110, inverter circuit 135, rectifier 140, switch 145, DC-DC converter 150 and converter assembly 180. DC bus 101 is connected to high voltage DC bus 25 by terminal 102.

Inverter circuit 135 is a bi-directional AC-DC converter that converts the power flowing between WFSM 220 and DC bus 101 into the appropriate voltage form (i.e., AC and DC). Inverter circuit 135 is connected to WFSM 220 at terminal 103 and comprises inverter 120 and GCU 130. GCU 130 regulates the output voltage of inverter circuit 135. Because GCU 130 and inverter 120 are included in the same device, i.e., power conditioning unit 100, GCU 130 functions can readily interface with engine starter functions and be part of the same control module as shown in control block 513 of FIG. 7.

Converter assembly 180 is a bi-directional AC-DC converter that converts the power flowing between the legacy AC bus and DC bus 101 into the appropriate voltage form (i.e., AC and DC), Converter assembly 180 is connected to the legacy AC bus at terminal 104 and comprises bi-directional converter 160, smoothing capacitors 170A and 170B, inverter 190 and filter 195.

Engine gear box 200 has a second shaft for accepting WFSM 220. The second shaft is engaged to engine gear box 200 during main engine startup and normal flight operation. During normal flight operation, WFSM 220 is a generator that supplies inverter circuit 135 with AC power. Inverter 120 of inverter circuit 135 converts the AC power from WFSM 220 to DC power. The DC power is then supplied to DC bus 101, which is connected to the high voltage bus 25 at terminal 102.

Figure 1:
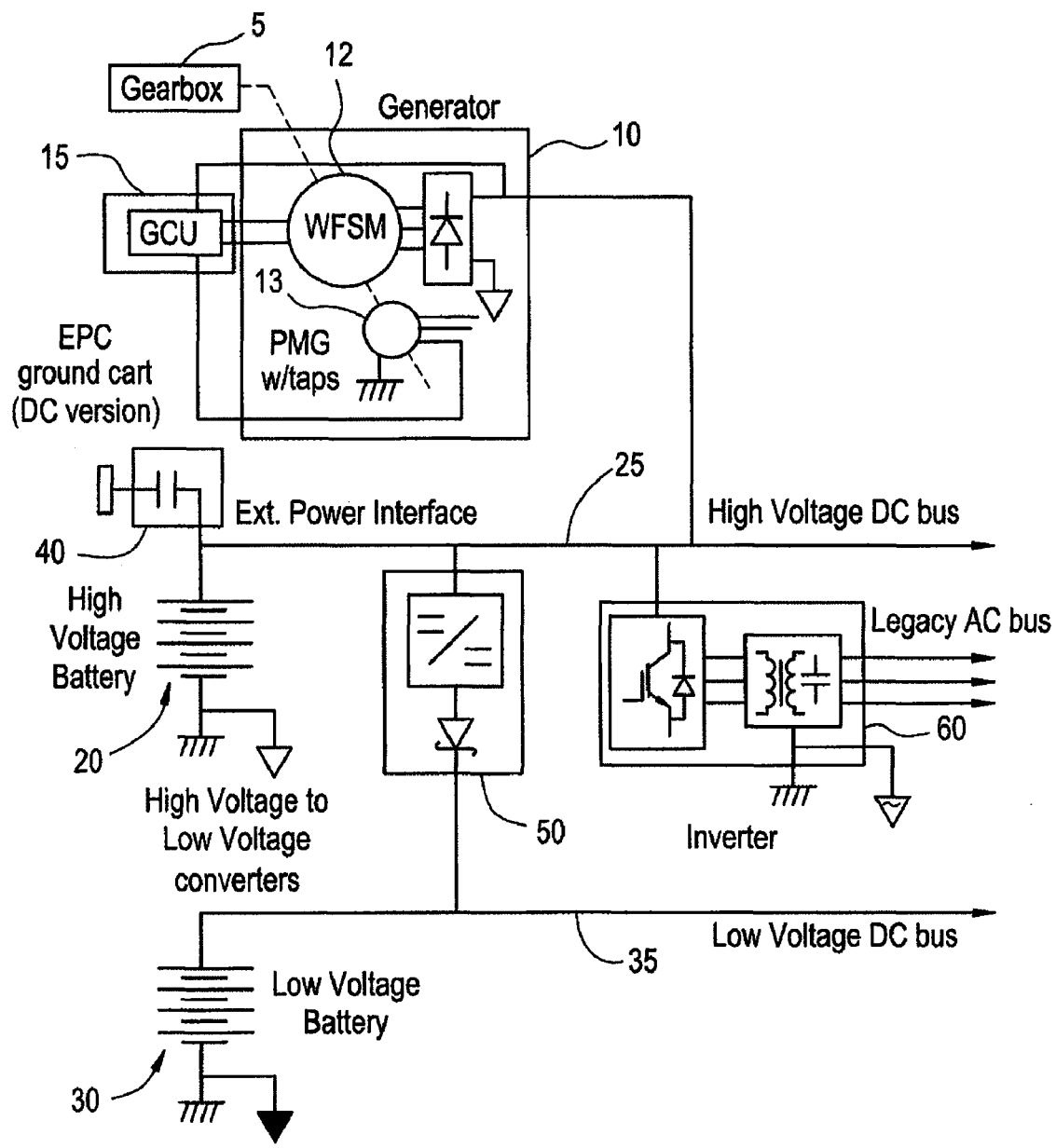
FIG. 1 is a block diagram of a related art modular power conditioning system.

PMG 230, which is mounted on the same shaft as WFSM 220, supplies power to rectifier 140, which then feeds DC-DC converter 150. DC-DC converter 150 feeds low voltage DC bus 35, which supplies control power to the system avionics. Although PMG 230 and DC-DC converter 150 are shown directly supplying low voltage DC bus 35 in FIG. 1, other configurations may be employed to interface PMG 230 to a DC bus (low or high) during normal or emergency conditions. For example, switch 145 enables PMG 230 to supply high voltage DC bus 25, if needed.

Along with feeding DC bus 101 during normal flight operation, inverter circuit 135 also feeds converter assembly 180. Bi-directional converter 160, capacitors 170A and 170B, inverter 190 and filter 195 of the converter assembly 180 convert DC voltage to AC voltage to feed the legacy AC bus. The legacy AC bus supplies power to equipment that run on, for example, 115 volts, 400 Hz. Bi-directional converter 160 is a DC-DC converter and may be, for example, a DC-DC converter disclosed in co-pending application titled "Low Mass Bi-directional DC to AC Interface Unit," the entire disclosure of which is incorporated herein by reference. Bi-directional converter 160 and filter 195 eliminate the requirement of using a transformer, thus, reducing the weight of the power conditioning unit.

During engine startup, WFSM 220 acts as startup motor for the main engines and receives its power from inverter circuit 135. Inverter 120 of inverter circuit 135 supplies the AC power needed by WFSM 220 by converting the power supplied by high voltage battery 20 via DC bus 101.

Converter assembly 180 may be used to assist high voltage battery 20 in main engine startup by taking advantage of the power supplied by EPC AC ground cart 46 via AC ground cart interface 45. Specifically, AC power supplied by EPC AC ground cart 46 is converted to DC voltage by filter 195 and inverter 190 and fed to bi-directional converter 160. Bi-directional converter 160 converts the power from inverter 190 and supplies DC power to inverter circuit 135 via DC bus 101. The power from converter assembly 180 supplements the power from the high voltage battery 20. By using an AC ground cart to assist in main engine startup, the onboard battery 20 can be "right-sized" for normal operating conditions rather than for the high peak currents during main engine startup.

If there is a generator failure or an engine flameout on the aircraft, a power conditioning unit consistent with the present invention takes advantage of the "windmill" power from permanent magnet generator (PMG) 210 to supplement battery power from high voltage battery 20. PMG 210 is mounted on a shaft that engaged to engine gear box 200 when the engines are "wind-milling." AC-DC converter 110 is connected to PMG 210 at terminal 107 and converts the AC voltage from PMG 210 to that of DC bus 111.

When the aircraft is "wind-milling," PMG 210 and AC-DC converter 110 supply emergency power to DC bus 101, which supplies power to the aircraft control system. Thus, the power conditioning unit consistent with the present invention allows for the onboard battery capacity to be reduced while still providing sufficient power to the aircraft control system. In an embodiment of the invention, there is more than one PMG to ensure sufficient power for critical equipment such as the aircraft avionics and the engine FADEC computer.

Figure 4:
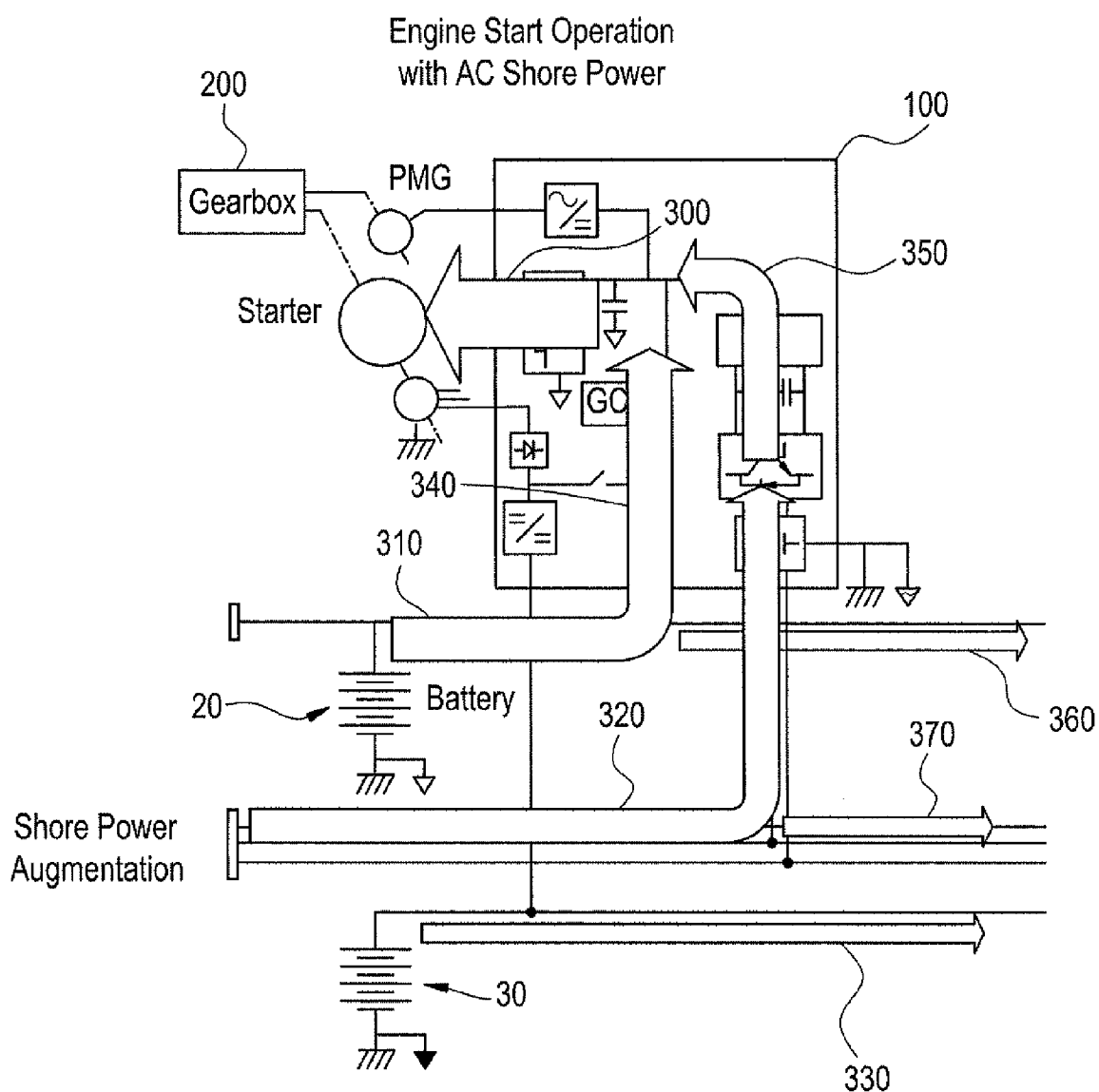
FIG. 4 is a power flow diagram for engine startup operation mode with ground power augmentation for an embodiment consistent with the present invention.

FIG. 4 illustrates the power flow diagram for main engine startup. The main engines (not shown) are started using WFSM 220, which is mounted to a shaft that is connected to the main engine. Inverter circuit 135 provides power 300 to WFSM 220 to drive the main engines. In the related art system, power 300 is entirely supplied by high voltage battery 20. However, as shown in FIG. 4, the present invention allows power 300 to be supplied from both high voltage battery 20 and converter assembly 180. That is, power 300 is a combination of power 340 from high voltage battery 20 and power 350 from shore power augmentation (e.g., an AC ground cart).

High voltage battery 20 produces power 310, which is split into power 340 and power 360. Power 340 is supplied to WFSM 220 via inverter circuit 135, and power 360 is used by the DC equipment in the aircraft. Power 350 is derived from shore power 320, which, in our exemplary embodiment (FIG. 3), is supplied from EPC AC ground cart 46. Along with supplying power that is converted to power 350, EPC AC ground cart 46 also supplies power 370 used by the legacy AC equipment. The remaining aircraft avionics are powered by power 330 from low voltage battery 30.

The system in FIG. 4 illustrates a mode where the main engine start is supported with AC shore (ground) power. However, DC shore power may also be used. For example, an EPC DC ground cart 41 (FIG. 1), when available, may also be used to supplement the high voltage battery 20 in producing power 310, or, if desired, EPC DC ground cart 41 may provide all of power 310.

Because an onboard battery that provides all the power for engine startup will be large, especially when the battery is designed to perform engine start operations in cold weather conditions, a power conditioning unit consistent with the present invention is flexible with respect to power flow and will allow engine start operations to be performed using supplemental power from AC or DC ground carts. Accordingly, the onboard battery in an aircraft using the present invention can be smaller and lighter than that of the related art systems.

Figure 5:
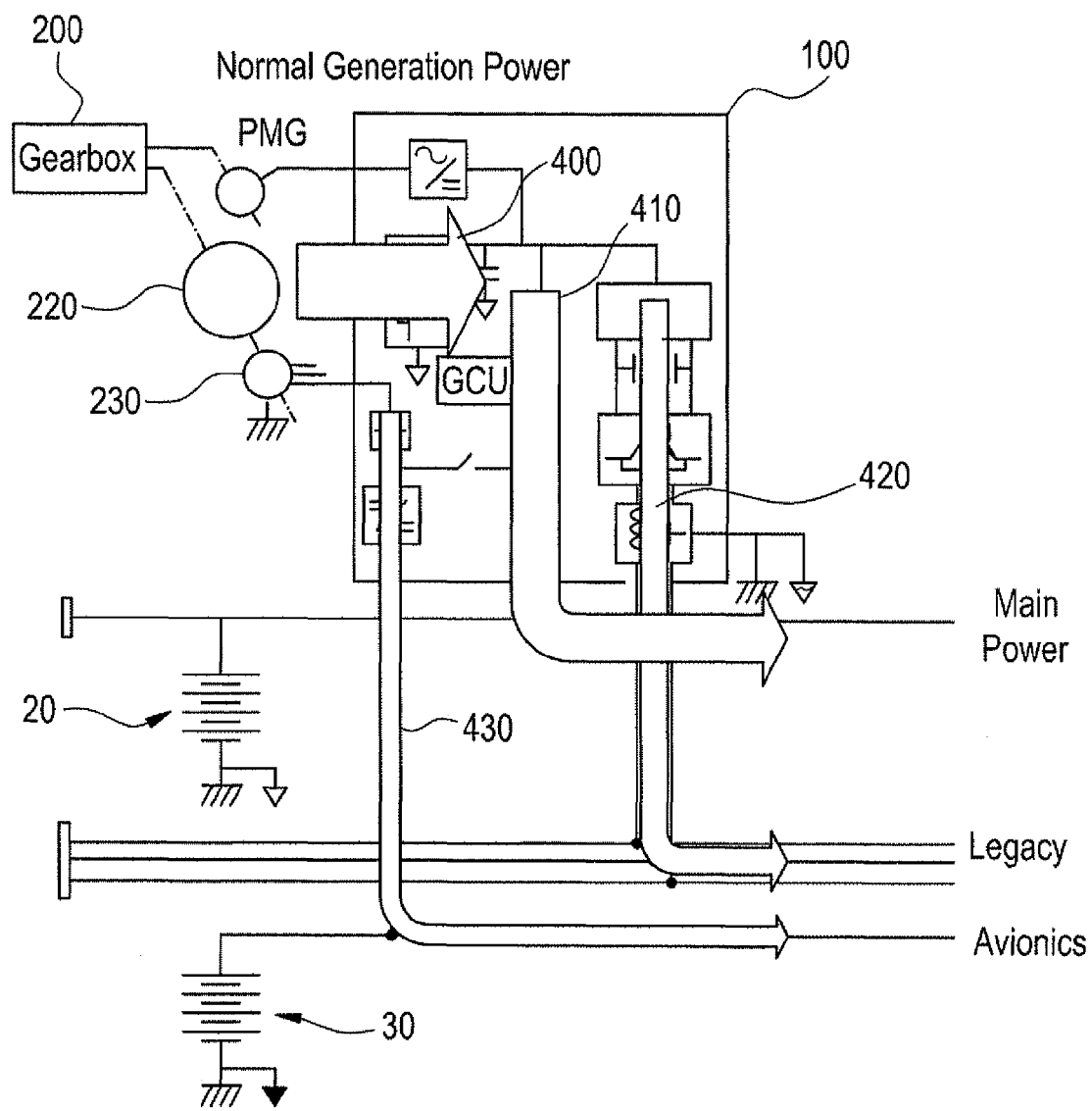
FIG. 5 is a power flow diagram for normal flight operation mode for an embodiment consistent with the present invention.

FIG. 5 illustrates the power flow diagram during normal flight operation. The shaft mounted WFSM 220 is driven by the main engine and generates power 400. A portion of power 400, represented as power 410, supplies DC bus 101, which is connected via terminal 102 to high voltage DC bus 25 (FIG. 3). During normal flight operation, high voltage battery 20 remains charged by DC bus 101. A battery charging unit (not shown) may be located between high voltage battery 20 and high voltage DC bus 25.

Another portion of power 400, represented as power 420, supplies converter assembly 180, which supplies AC power to the legacy AC bus.

PMG 230 generates power 430 that is supplied to low voltage DC bus 35 via rectifier 140 and DC-DC converter 150. During normal flight operation, onboard low voltage DC battery 30 remains charged by low voltage DC bus 35. A battery charging unit (not shown) may be located between low voltage battery 30 and low voltage DC bus 35.

Figure 6:
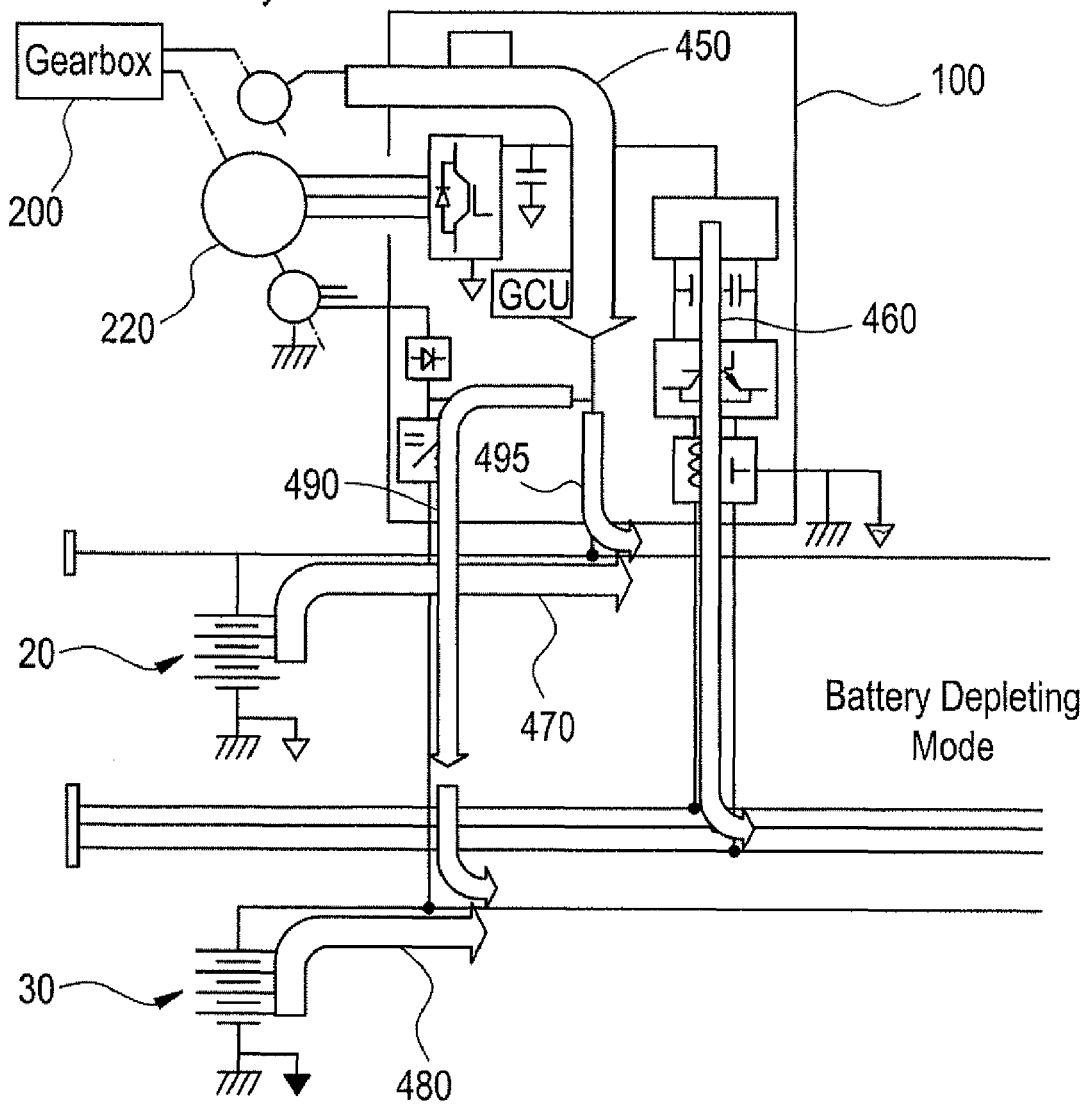
FIG. 6 is a power flow diagram for emergency operation mode showing windmill power supplementing the battery during flight decent for an embodiment consistent with the present invention.

FIG. 6 illustrates a power flow diagram for emergency operation. In the scenario represented in FIG. 6, the aircraft is descending without the main engines and relies on high voltage battery 20 for aircraft power. However, because PMG 210 is connected to the main engines by a second shaft, the power conditioning unit of the present invention can take advantage of the "wind-milling" of the main engines during descent. During this period, PMG 210 supplies power 450 via DC-DC converter 110 and power 450 may be used to supplement high voltage system power 470 and low voltage system power 480. The high voltage supplemental power is represented as power 495, and the low voltage supplemental power is represented as power 490.

Power 470 and power 495 supply high voltage DC bus 25 used by the DC equipment in the aircraft. In addition, high voltage DC bus 25 supplies power via DC bus 101 to converter assembly 180, which supplies the legacy AC bus.

Power 480 and power 490 supply the low voltage bus that is used by the system avionics. Power 490 is supplied to DC-DC converter 150 through switch 145, which is closed during emergency operation.

Figure 2:
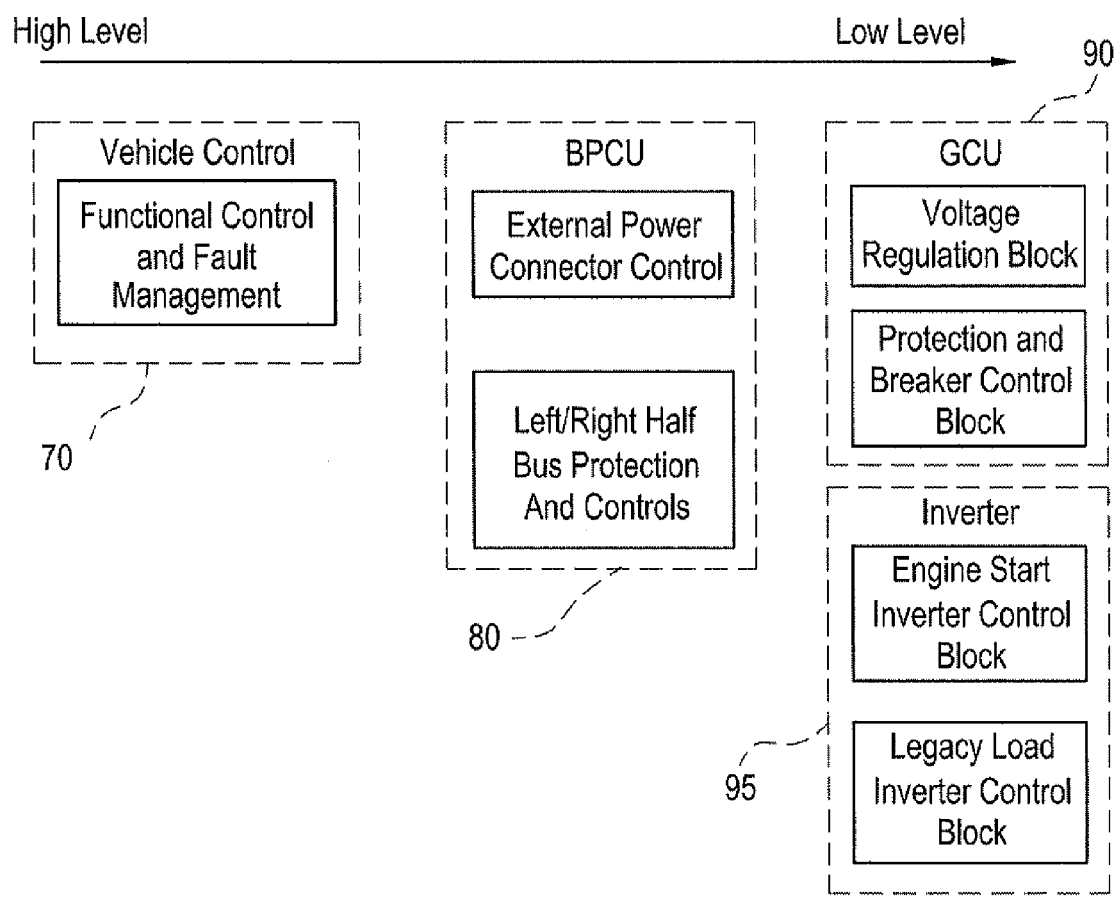
FIG. 2 shows a control block diagram of control modules in the related art system of FIG. 1.
Figure 7:
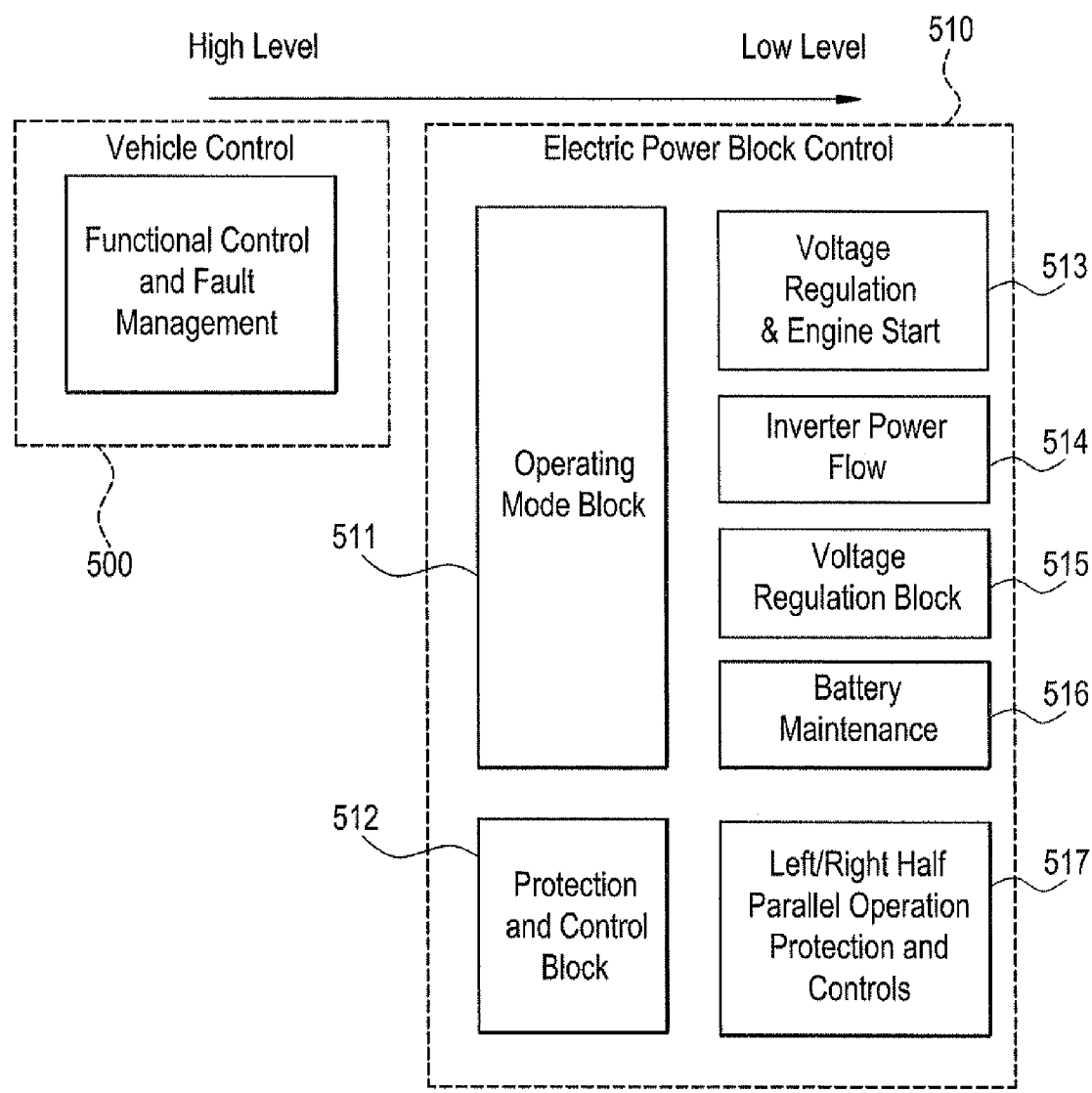
FIG. 7 shows a control block diagram of a control module for an embodiment consistent with the present invention.

A control block diagram for operating the integrated power conditioning unit is illustrated in FIG. 7. Similar to the related art system, the vehicle control module 500 is run at the "highest" level and contains the functional control and fault management functions for making "strategic decisions," However, in contrast to the three levels of controls and the modular layout of the related art system of FIG. 2, the present invention operates with fewer levels and integrates the control modules. That is, the "detailed" functions performed may be integrated into a single control module.

In a power conversion unit of the present invention, control function blocks 511 to 517 operating the various components of power conversion unit 100 are integrated into a single control module such as electric power block control module 510. In addition, the individual functional blocks integrate functions that were separate in the related art systems. For example, Voltage Regulation & Engine Start block 513, which controls inverter circuit 135, performs the functions of the related art GCU module 90 and Inverter module 95. Thus, the present invention includes a control system that is less complex and has less wiring (less mass) than the related art modular control system.

While the invention has been described in terms of various specific embodiments, those skilled in the art will recognize that the invention can be practiced with modification within the spirit and scope of the claims.

What is claimed is:

1. An integrated power conditioning unit, comprising:
   a DC bus;
   a first terminal for connection to first AC equipment;
   a second terminal for connection to second AC equipment;
   a third terminal for connection to third AC equipment;
   a first inverter circuit providing bi-directional AC-DC conversion between a first AC power signal and a first DC power signal, the first DC power signal flowing from/to the DC bus and the first AC power signal flowing from/to the first terminal;
   a converter assembly providing bi-directional AC-DC conversion between a second AC power signal and a second DC power signal, the second DC power signal flowing from/to the DC bus and the second AC power signal flowing from/to the second terminal, wherein the converter assembly comprises:
      a DC-DC bi-directional converter providing bi-directional DC-DC conversion between the second DC power signal and a third DC power signal;
      an AC-DC bi-directional inverter connected to the DC-DC bi-directional converter and providing bi-directional AC-DC conversion between the third DC power signal and the second AC power signal; and
      a transformerless filter connected to the AC-DC bi-directional inverter and configured together with the AC-DC bi-directional inverter to generate the third DC power signal;
   and
   a rectifier and DC-DC converter together configured to provide AC-DC conversion between a third AC power signal and a fourth DC power signal, the fourth DC power signal selectively flowing to the DC bus via a switch and the third AC power signal flowing from the third terminal.

2. The integrated power conditioning unit of claim 1, further comprising:

a control module controlling the first inverter circuit such that the first DC power signal flows from the DC bus to the first inverter circuit and the first AC power signal flows from the first inverter circuit to the first terminal, and controlling the converter assembly such that the second AC power signal flows from the second terminal to the converter assembly and the second DC power flows from the converter assembly to the DC bus.

3. The integrated power conditioning unit of claim 1, further comprising:
a control module controlling the first inverter circuit such that the first AC power signal flows from the first terminal to the first inverter circuit and the first DC power signal flows from the first inverter circuit to the DC bus, and controlling the converter assembly such that the second DC power flows from the DC bus to the converter assembly and the second AC signal power flows from the converter assembly to the second terminal.

4. The integrated power conditioning unit of claim 1, further comprising:
a fourth terminal for connection to a fourth AC source providing a fourth AC power signal;
an AC-DC converter connected to the fourth terminal, the AC-DC converter converting the fourth AC power signal to a fourth DC power signal and supplying the DC bus with the fourth DC power signal.

5. A starter/generator system for an aircraft, the starter/generator system comprising:
an engine startup-motor/generator;
a first generator;
an AC bus; and
a power conditioning unit comprising:
a DC bus;
a first inverter circuit providing bi-directional AC-DC conversion between a first AC power signal and a first DC power signal, the first DC power signal flowing from/to the DC bus and the first AC power signal flowing from/to the engine startup-motor/generator;
a converter assembly providing bi-directional AC-DC conversion between a second AC power signal and a second DC power signal, the second DC power signal flowing from/to the DC bus and the second AC power signal flowing from/to the AC bus, wherein the converter assembly comprises:
a DC-DC bi-directional converter providing bi-directional DC-DC conversion between the second DC power signal and a third DC power signal;
an AC-DC bi-directional inverter connected to the DC-DC bi-directional converter and providing bi-directional AC-DC conversion between the third DC power signal and the second AC power signal; and
a transformerless filter connected to the AC-DC bi-directional inverter and configured together with the AC-DC bi-directional inverter to generate the third DC power signal; and
a rectifier and DC-DC converter together configured to provide AC-DC conversion between a third AC power signal and a fourth DC power signal, wherein the third AC power signal flows from the first generator and the fourth DC power signal selectively flows to the DC bus via a switch.

6. The starter/generator system for an aircraft of claim 5, further comprising:
a control module for controlling the power conditioning unit in at least one of a startup operation mode and a flight operation mode.

7. The starter/generator system for an aircraft of claim 6, wherein the DC bus is connected to an onboard battery.

8. The starter/generator system for an aircraft of claim 7, wherein, during the startup operation mode, the control module controls the first inverter circuit such that the first DC power signal flows from the DC bus to the first inverter circuit and the first AC power signal flows from the first inverter circuit to the engine startup-motor/generator, and controls the converter assembly such that the second AC power signal flows from the AC bus to the converter assembly and the second DC power signal flows from the converter assembly to the DC bus.

9. The starter/generator system for an aircraft of claim 8, wherein the AC bus is connected to an AC ground cart.

10. The starter/generator system for an aircraft of claim 9, wherein the AC bus is connected to 115 VAC, 400 Hz equipment.

11. The starter/generator system for an aircraft of claim 6, wherein, during the startup operation mode, the control module controls the first inverter circuit such that the first DC power signal flows from the DC bus to the first inverter circuit and the first AC power signal flows from the first inverter circuit to the engine startup-motor/generator, and controls the converter assembly such that the second DC power signal flows from the DC bus to the converter assembly and the second AC power signal flows from the converter assembly to the AC bus.

12. The starter/generator system for an aircraft of claim 11, wherein the DC bus is connected to a DC ground cart.

13. The starter/generator system for an aircraft of claim 7, wherein, during the flight operation mode, the control module controls the first inverter circuit such that the first AC power signal flows from the engine startup-motor/generator to the first inverter circuit and the first DC power signal flows from the first inverter circuit to the DC bus, and controls the converter assembly such that the second DC power signal flows from the DC bus to the converter assembly and the second AC power signal flows from the converter assembly to the AC bus.

14. The starter/generator system for an aircraft of claim 13, wherein the AC bus is connected to 115 VAC, 400 Hz equipment.

15. The starter/generator system for an aircraft of claim 6, further comprising:
an AC-DC converter with an input connected to a second generator that provides a fourth AC power signal when the aircraft is wind-milling, the AC-DC converter having an output connected to the DC bus.

16. The starter/generator system for an aircraft of claim 15, wherein, during an emergency operation mode, the control module controls the second generator AC-DC converter to provide a fifth DC power signal to the DC bus, and controls the converter assembly such that the second DC power flows from the DC bus to the converter assembly and the second AC power signal flows from the converter assembly to the AC bus.

* * * * *